Figure 1:
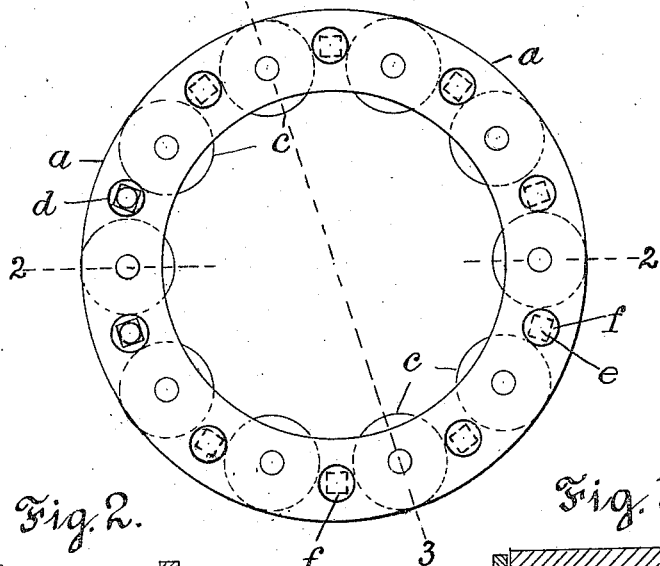

C. KNOTH.
RIVET CONNECTION FOR TIE BARS.
APPLICATION FILED JULY 31, 1917.

1,250,595.

Patented Dec. 18, 1917.

Inventor
Conrad Knoth, jun.
Thos. S. Crane Atty.

UNITED STATES PATENT OFFICE.

CONRAD KNOTH, OF NEWARK, NEW JERSEY, ASSIGNOR TO HYATT ROLLER BEARING DIVISION, UNITED MOTORS CORPORATION, OF HARRISON, NEW JERSEY, A CORPORATION OF NEW YORK.

RIVET-CONNECTION FOR TIE-BARS.

1,250,595.
Specification of Letters Patent.
Patented Dec. 18, 1917.

Application filed July 31, 1917. Serial No. 183,807.

*To all whom it may concern:*

Be it known that I, CONRAD KNOTH, a citizen of the United States, residing at #173 Jelliff Ave., Newark, county of Essex, and State of New Jersey, have invented certain new and useful Improvements in Rivet Connections for Tie-Bars, fully described and represented in the following specification and the accompanying drawings, forming a part of the same.

The present invention relates to an improved method of engaging tie-bars with the heads of a roll-cage, such as is used in roller-bearings and similar structures for holding the rolls in parallelism with one another.

The invention is especially applicable to a cage in which the tie-bars are formed with round tenons or studs upon the ends projected through holes in the cage and riveted or upset in such holes to secure the heads together.

The object of the invention is chiefly to prevent the tie-bars from working loose where engaged with the heads, and especially to prevent their being rotated in the holes of the heads where such engagement is made.

This sometimes occurs where the tie-bars are used as separators between revolving rolls, and if they are jarred loose in their holes, are liable to be rotated by contact with the rolls during their normal operation. Such rotation of the tie-bars quickly wears the tenons where they are loose in the holes and renders them incapable of holding the heads of the cage in the proper relation to one another. Such loosening and rotation are wholly prevented in the present invention, by making the holes in the heads square or other polygonal shape and expanding round tenons upon the tie-bars to fill such polygonal holes.

To lock the tie-bars very firmly to the heads without any projection upon the outer sides of the heads, the outer ends of the holes or square mortises are preferably counterbored, and the tie-bars formed with studs or tenons adapted to extend through the square holes and counterbores, and projected beyond the outer sides of the heads sufficiently to fill the square holes and the counterbores when the tenons are upset by riveting.

Round tenons are necessary, or at least preferably used, upon the ends of the tie-bars, because they may be cheaply formed by rotating tools operating to reduce the metal at the ends of the tie-bars to the proper dimensions for the tenons, and also to form shoulders upon the tie-bars at the bases of the tenons, whereas square or polygonal tenons would require much more labor to form.

I find that, in practice, the round tenons can be made to wholly fill the polygonal mortises or holes in the heads and the counterbores at the outer ends of such mortises; and a very rigid engagement with the heads is thus secured, which not only prevents the tenons from rotating but also locks each head firmly between the shoulder of the tie-bar and the end of the tenon where expanded into the counterbore.

Figure 2:
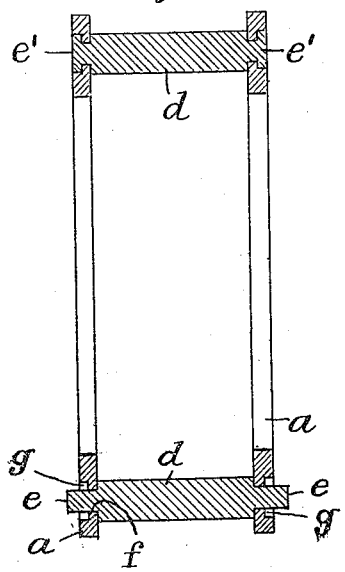
Figure 3:
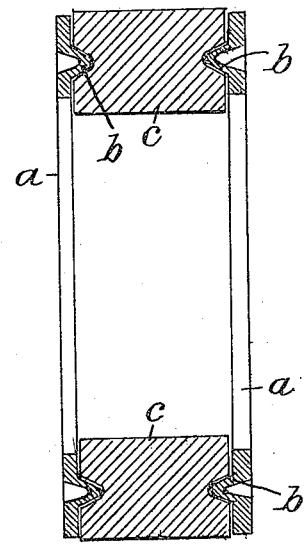
Figure 4:
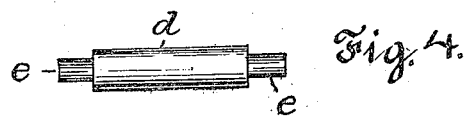

The invention will be understood by reference to the annexed drawing, in which Figure 1 is an end view of a roll-cage having ten rolls with intermediate tie-bars; Fig. 2 is a longitudinal section of a cage on line 2—2 in Fig. 1; Fig. 3 is a longitudinal section on line 3—3 in Fig. 1 with one of the tie-bars riveted and the other in readiness to rivet; Fig. 4 is a side view of one of the tie-bars formed with the required tenons; and Fig. 5 represents each end of the tie-bar upset to fill the mortise and counterbore, but disconnected from the same to show their expanded form.

The heads *a* are shown of flat annular form with studs *b* upon their inner sides, to loosely engage holes in the ends of the rolls *c* and keep the rolls in the cage during handling or transportation.

Tie-bars *d* are shown connecting the heads intermediate to the roll-studs and formed with round tenons *e* upon the ends which are proportioned to pass through square mortises *f* in the heads. The tie-bars are proportioned to guide the rolls and hold them in parallelism with one another and with the axis of the bearing, and the mortises are located to hold the tie-bars in their positions.

Figure 5:
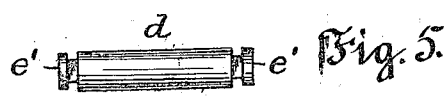

To avoid any projection upon the outer sides of the heads, the outer ends of the mortises are necessarily recessed to receive the ends of the tenons when expanded or upset, and such recess is preferably made in the form of a counterfore $g$ so that when the tenon is expanded into the same it will form a flat head, as shown at $e'$ in Fig. 5, which locks the tie-bar to the head very securely.

In practice, the upsetting or riveting of the tenons is made by an electric swage which softens and rivets the head instantaneously, and thus enables the metal of the tenons to readily fill the mortises and counterbores.

The cross-section of the mortise is immaterial if its shape is adapted to prevent any turning of the tenon when expanded therein, and any such shape is understood to be included in the word "polygonal" in the present specification.

Having thus set forth the nature of the invention what is claimed herein is:

1. The parts to form a roll-cage, comprising heads having square holes to engage tie-bars and circular counterbored recesses at the outer ends of such square holes, with tie-bars having cylindrical tenons projected through the square holes and beyond the outer sides of the said heads sufficiently to be expanded into the square holes and fill the counterbores.

2. An annular head, for a roll-cage, having square holes formed therein for the tenons of tie-bars, and the head upon the outer end of each square hole having a circular counterbore adapted to receive the expanded outer end of the tenon.

In testimony whereof I have hereunto set my hand.

CONRAD KNOTH.